May 20, 1952 E. T. WEBB 2,597,830
METHOD OF APPLYING THERMOPLASTIC CLOSURES
TO BOTTLES AND OTHER CONTAINERS
Filed Nov. 6, 1947 8 Sheets-Sheet 1

Inventor
E. T. Webb
By Glenwick Downing Pickle
Attys.

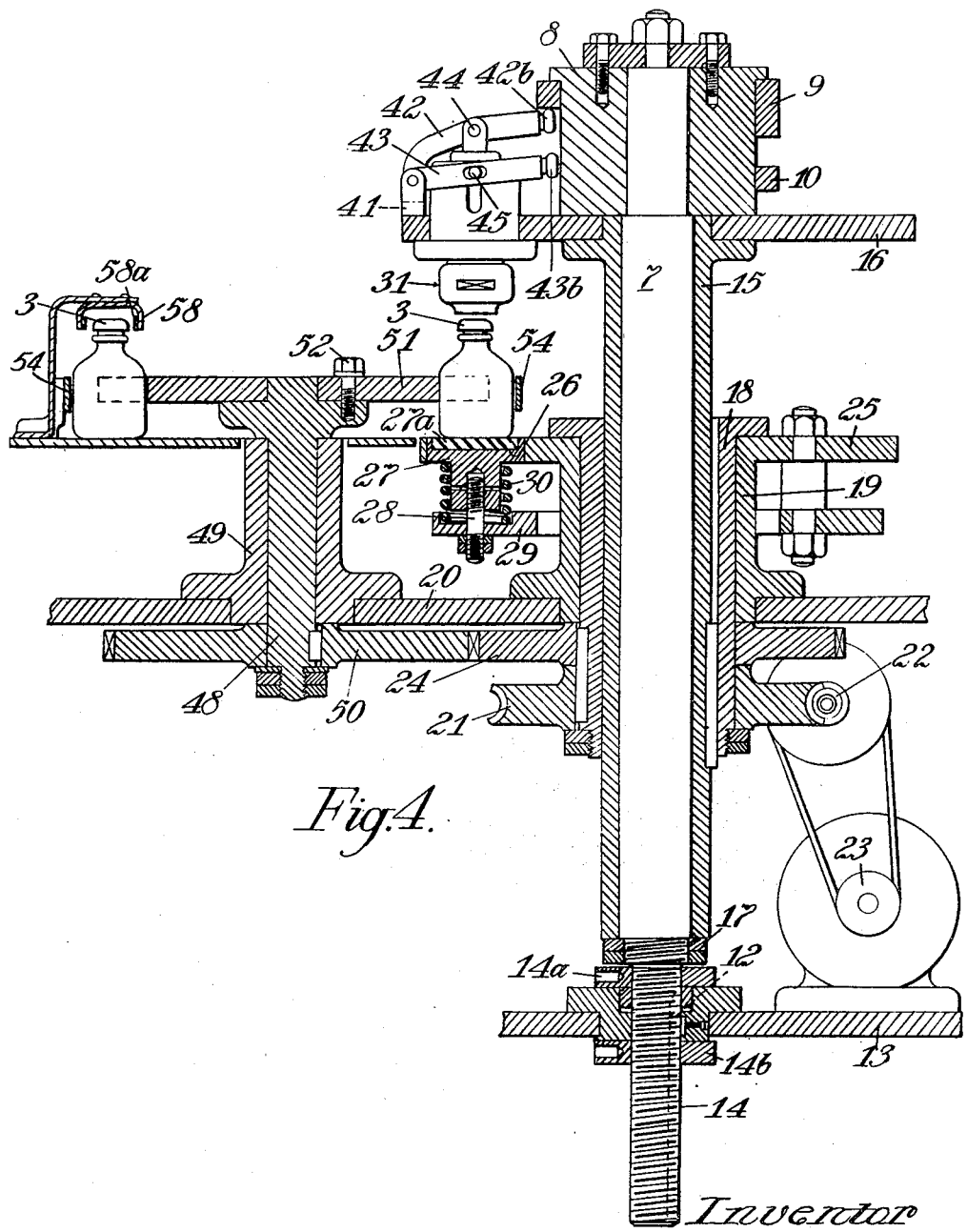

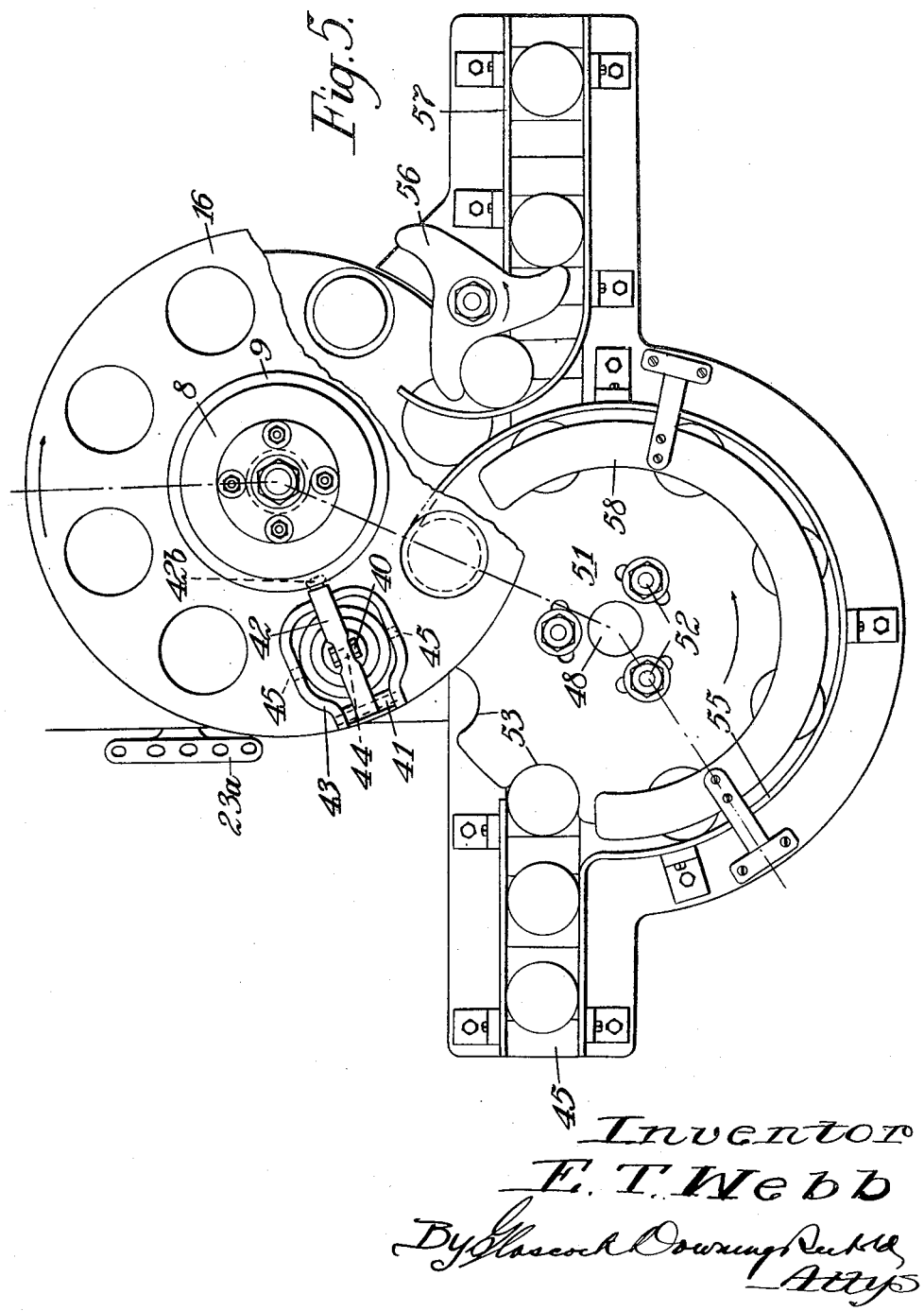

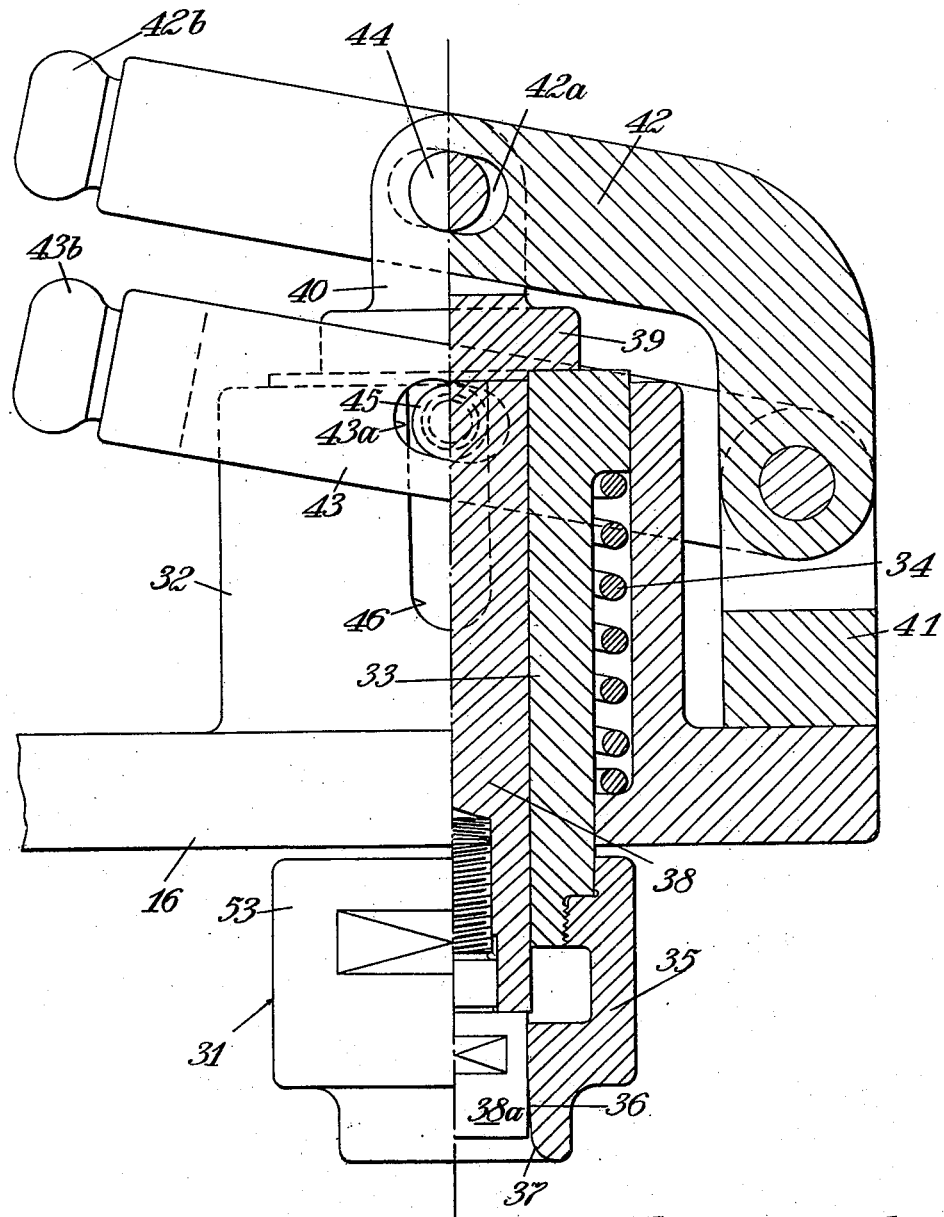

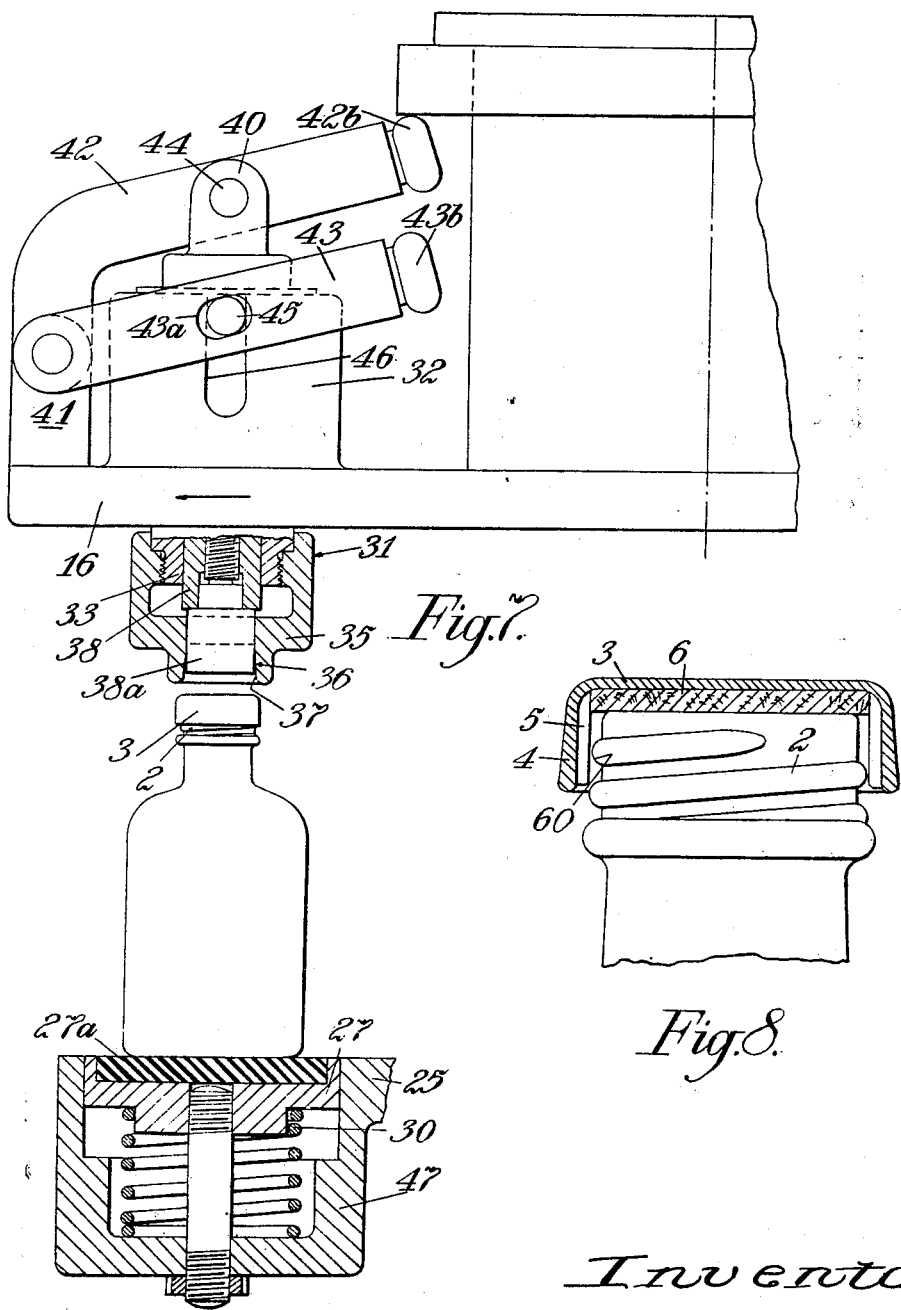

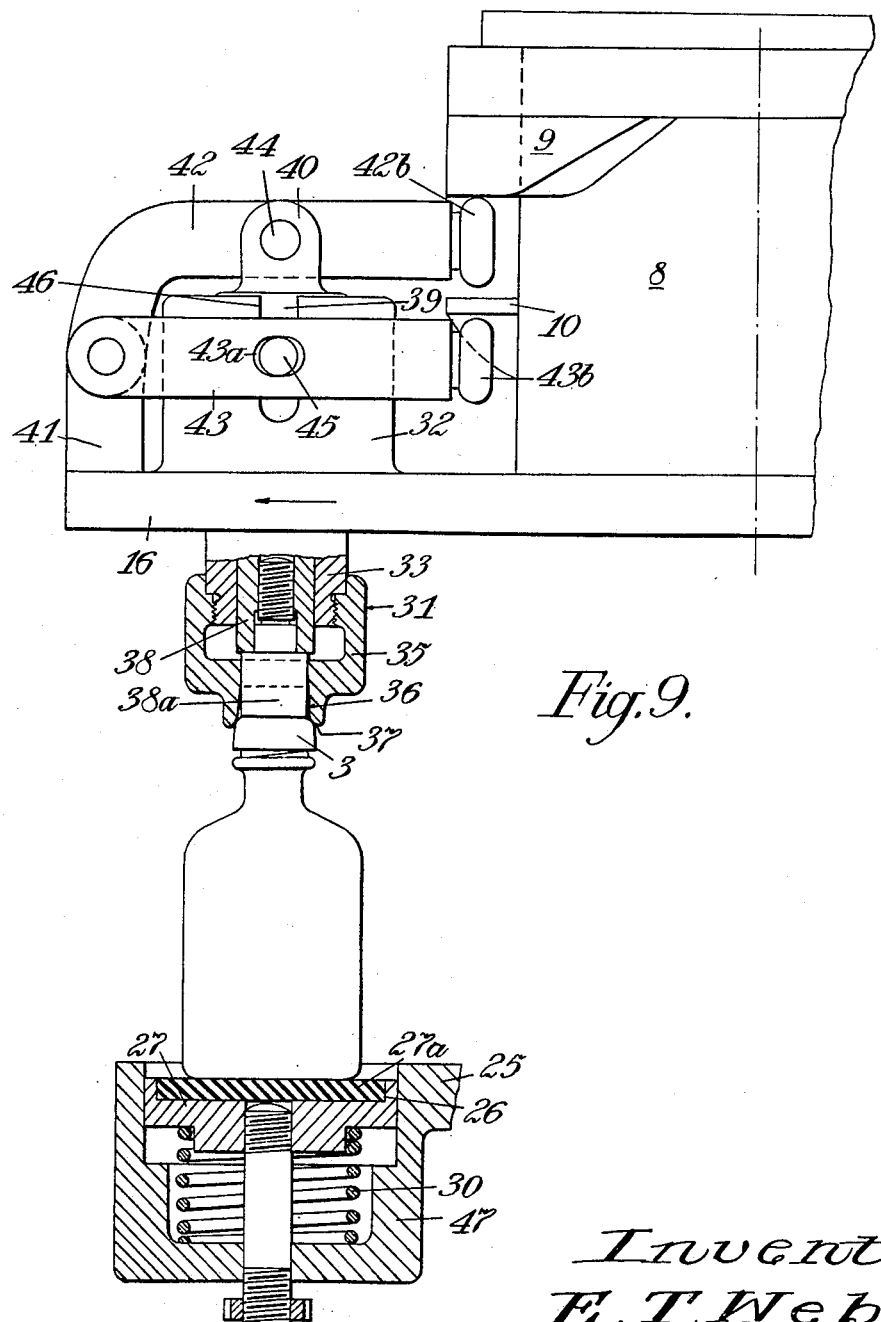

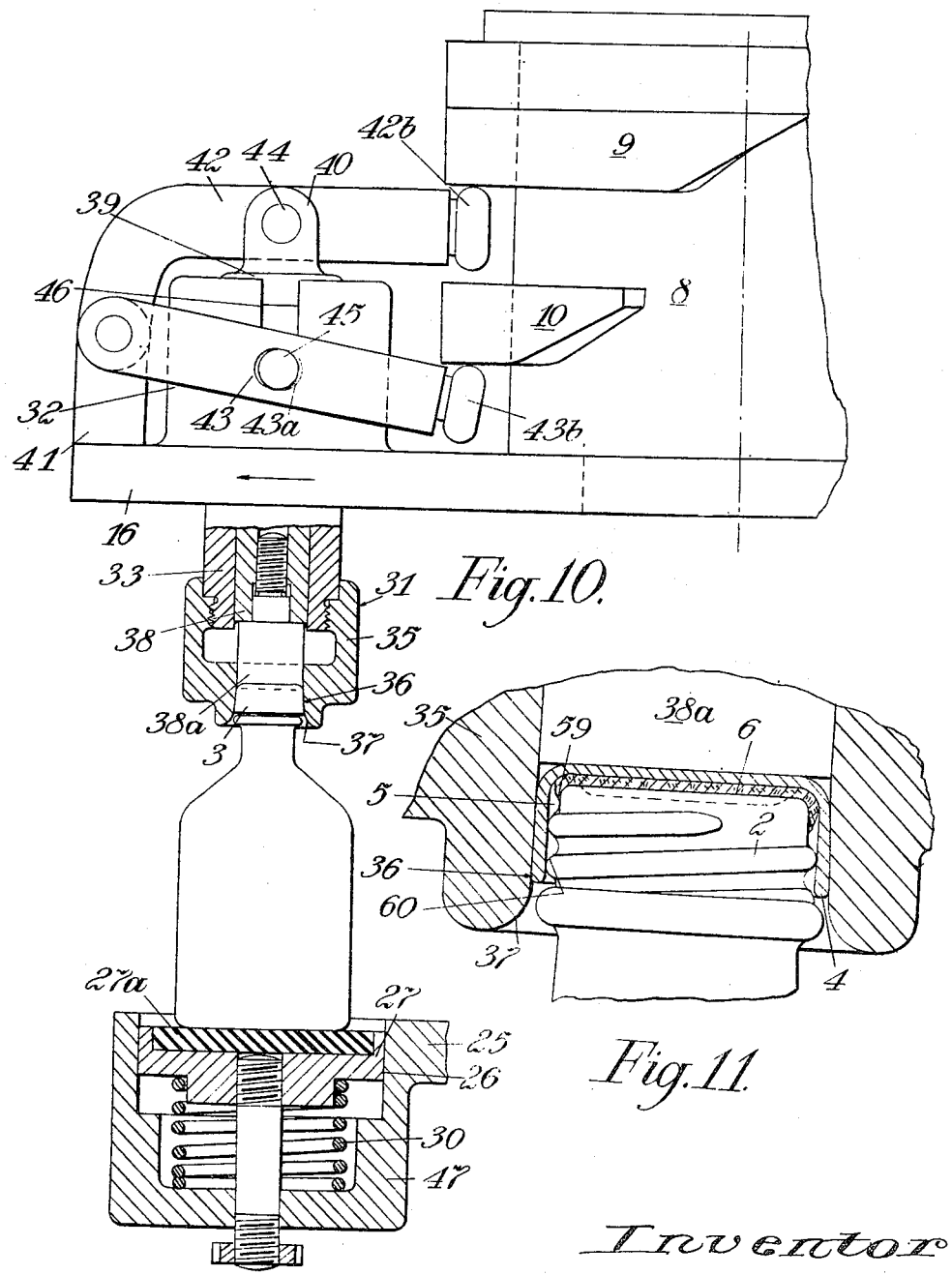

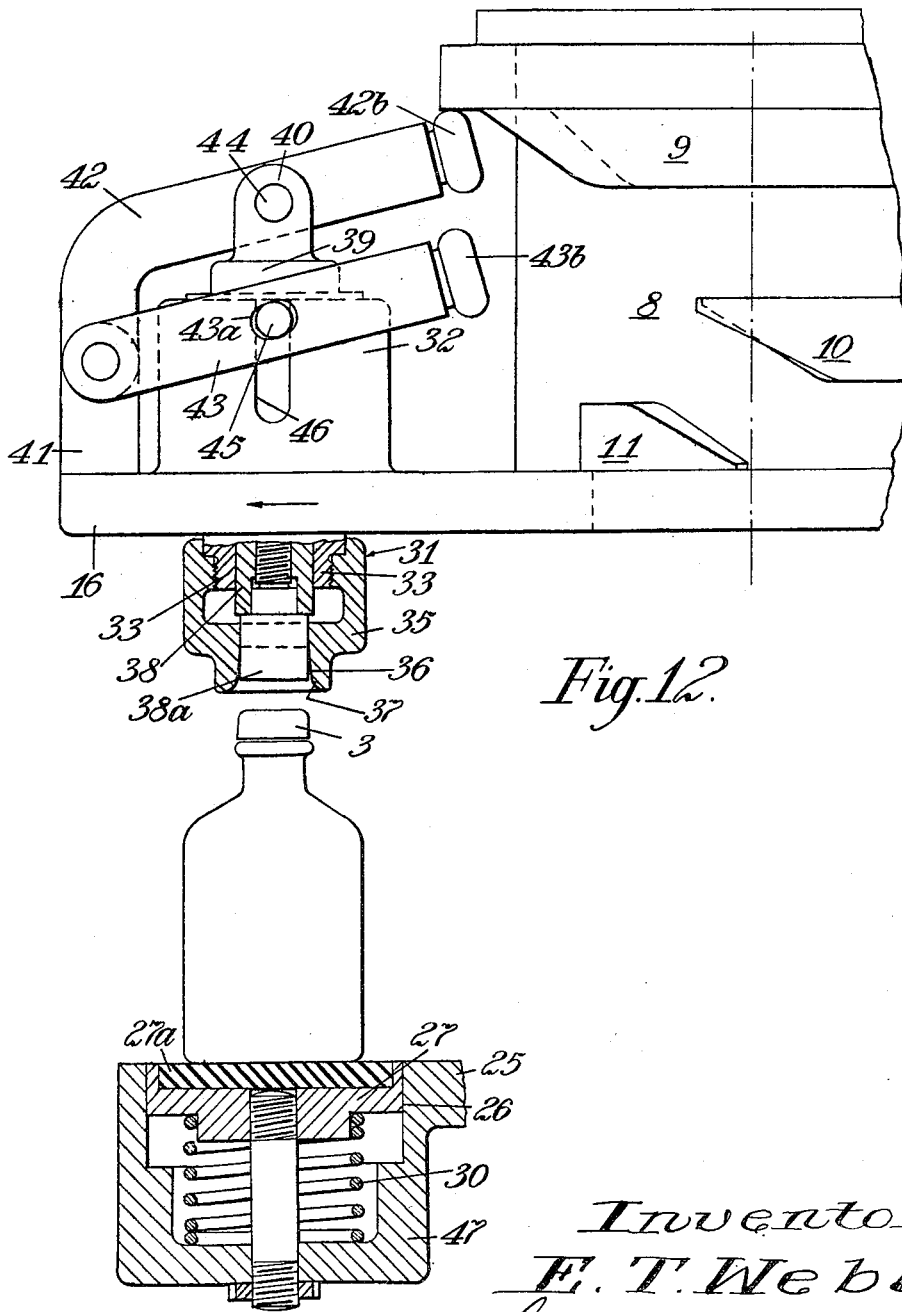

Patented May 20, 1952

2,597,830

UNITED STATES PATENT OFFICE 2,597,830

METHOD OF APPLYING THERMOPLASTIC CLOSURES TO BOTTLES AND OTHER CONTAINERS

Edward Thomas Webb, Iver, England, assignor to Metal Closures Limited, West Bromwich, England Application November 6, 1947, Serial No. 784,452
In Great Britain November 7, 1946

3 Claims. (Cl. 226—84)

This invention relates to a method of applying thermoplastic caps to bottles, jars or like containers (hereinafter called "containers") of the type having an external screwthread or the like at the mouth which is engaged by the cap for closure or sealing purposes.

The aim of the present invention is to utilise the properties of thermoplastics in the production and application of caps to containers whereby the latter may be fitted with a reliable sealing cap which may be released by a normal unscrewing manipulation.

An advantage afforded by the invention is that each cap is individually formed to fit the particular container for which it is intended, and consequently any irregularities in that part of the container engaged by the cap are accommodated and misfits or leakages are eliminated. Furthermore, by aid of the invention the usual lining disc of resilient or cushioning material is snugly sealed upon the container in the operation of applying the cap, although in some cases the invention may be carried out (owing to the advantage above specified) in the absence of a lining disc.

The cap to be employed is formed with a series of circumferential spaced interior ribs extending longitudinally of the cylindrical part or skirt of the cap, and projecting inwardly a sufficient amount to accommodate the impression of fragments or sections of the container thread.

The ribbing is such as locally to increase the thickness of the skirt wall as seen in the accompanying drawing and ribs or ribbing which are pressed or moulded out of the skirt wall and consequently produce counterpart external grooves, are unsuitable.

The invention consists in a method of making an interrupted screwthreaded fitting engagement between a container mouth having a continuous external thread and a thermoplastic cap having a top portion and a cylindrical skirt formed locally of increased thickness by ribbing projecting from the interior surface of the skirt, comprising pressing the said top portion of said cap, preheated to render it suitably plastic, onto the rim of the container mouth and then applying a pressure contact around the exterior periphery of the skirt and progressively advancing such pressure contact axially downward over said skirt to force the skirt ribbing, without bending the skirt, onto said container screwthread and cause a local displacement of the plastic material of the ribbing where it engages the container screwthread, thereby producing in the ribbing, concave depressions which constitute the counterpart of the container thread in interrupted form of which there is no visible indication on the exterior of the skirt.

The term "screwthread" or "thread" as used herein with respect to the cap or the container neck or mouth is intended to include the usual continuous helix, a multi-start thread or like cam form.

The caps may be made of any suitable thermoplastic and the thermoplastic chosen may be varied within limits so as to suit the climatic conditions to which the caps will be exposed. A suitable thermoplastic is one which remains set or rigid at a temperature of about 140° to 150° F. and is sufficiently plastic for the purposes in question at about 170° to 180° F.

For the purpose of carrying out the method above defined it is preferred to employ a machine for applying the thermoplastic cap to a container, comprising a capping head having a pressure block for the cap top and a coaxial taper throat die for constricting the peripheral wall of the cap upon the container thread, and means for effecting axial displacement firstly of the block, secondly of the die, and then for retracting the die relatively to the block, and finally withdrawing the block to disengage the cap.

In the accompanying drawings:

Figure 4 is a fragmentary sectional elevation of an automatic machine suitable for carrying the invention into effect, and Figure 5 is a plan view of the machine.

Figure 6 is an elevation partly in section of a capping head illustrating the pressure block and taper throat for applying the caps according to the invention.

Figure 7 is a fragmentary view of the pressure head and container platform, with the parts in the starting position.

Figure 8 is an elevation of the neck of a container with the cap shown in section placed in position ready for engagement by the pressure block and throat die.

Figure 9 is a view corresponding to Figure 7 in which the pressure block is shown as having descended to press the top of the cap or its lining disc into sealing relationship with the rim of the container.

Figure 10 shows a similar view illustrating the descent of the taper throat die applying the constricting pressure, and Figure 11 is a fragmentary enlarged sectional view showing the compression of the periphery of the cap onto the container thread.

Figure 12 is a similar view to Figure 7 where the parts are returning to the starting position.

Figure 1:
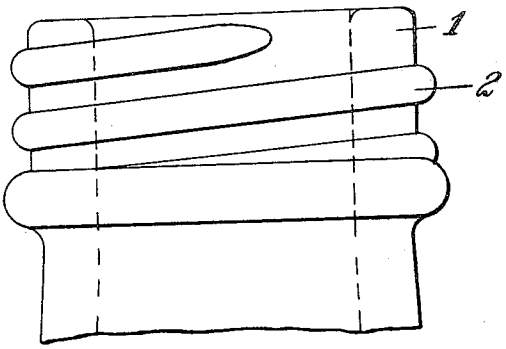
Figure 1 is an outside fragmentary elevation of a screwthread bottle or container neck, as exemplifying one form to which the invention may be applied.
Figure 3:
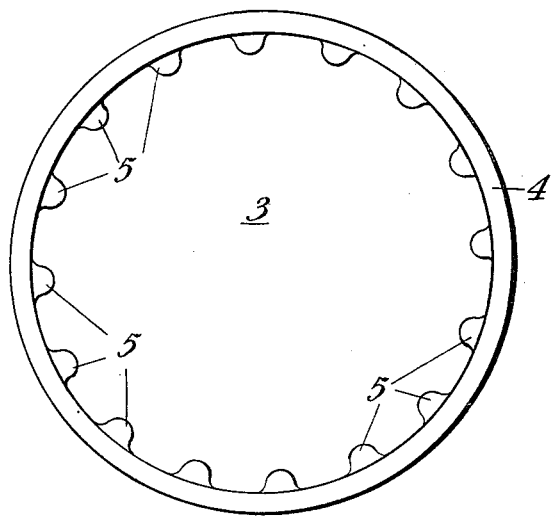
Figure 3 is an underneath plan view thereof.
Figure 2:
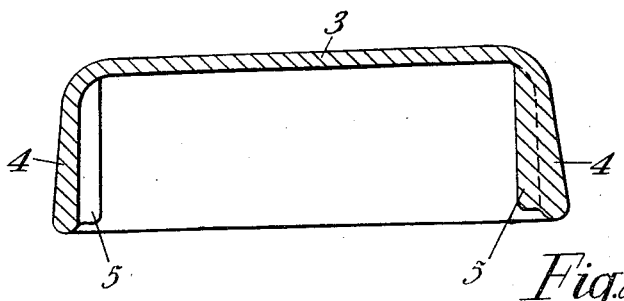
Figure 2 is a sectional elevation of an internally ribbed thermoplastic cap according to the invention.

In carrying the invention into effect according to one mode as described by way of example as concerned with the application of caps to container necks as seen in Figure 1, the neck 1 has a thread 2 of the known continuous type, and a cap 3 is made of a suitable thermoplastic, such as cellulose acetate, by any suitable known means, with a skirt peripheral portion 4 formed on its interior surface with projecting ribs 5. These ribs are spaced circumferentially as seen in Figure 3 and extend longitudinally or parallelly with the axis of the cap as illustrated in Figure 2. The radial dimensions of the ribs and skirt are such that the cap may be freely introduced over the container neck as shown in Figure 8 where a lining disc of compressible or resilient material 6 is shown in position.

The machine for carrying out the invention has a central vertical column 7 on the upper end of which a drum 8 is fixed on which cams for controlling the operations of the capping head are mounted. Certain of these cams 9, 10, 11 are illustrated in Figures 4 and 5 and other figures of the drawings. The foot of the column is screwthreaded and has a keyway engaged by a key 12 so that it may be adjusted vertically while being prevented from rotation. The column is held in a lower platform 13 supported in the framework of the machine, between nuts engaging the screwthreaded portion 14 of the column. A coaxial inner sleeve 15 surrounds the column 7 and is capable of rotation with respect thereto and has secured to an upper flanged portion a head supporting platform 16. The foot of the sleeve 15 is secured axially by nuts 17 and is movable axially with the column 7 for vertical adjustments, the adjustment of the column being effected by a nut 14a operating on the screwthread 14, and is locked by nut 14b.

The column sleeve 15 is surrounded by an outer sleeve 18 located in a main bearing 19 secured to an upper main platform 20 supported in the frame of the machine. The sleeve 18 is keyed to the sleeve 15 and is rotated by a worm wheel 21 driven by a worm 22 from a motor 23 or handwheel 23a. The sleeve 18 also carries a spur gear 24 for driving the feed table of the machine described hereinafter.

Secured to the upper end of the sleeve 18 is a container mounting table 25 in which a series of circular apertures 26 are provided for receiving container rest platforms 27. These platforms, which are provided with rubber pads 27a, are carried by plungers 28 which may be guided in a subplatform 29 and are supported resiliently by strong springs 30 which are adapted to react to the normal operation of the head upon the containers to afford a predetermined working pressure.

A series of capping heads 31, corresponding with the number of platforms 27, are mounted in the head platform 16 and positioned coaxially over the container rest platforms 27. Each head is located in a housing sleeve or collar 32 which may be formed integral with the platform 16. Within this collar a die plunger 33 is vertically slidable against the resistance of a return spring 34, the lower end of the plunger carrying a throat member 35 which has an internally tapered annulus or throat 36 suitably radiused at 37 to constitute a pressure applying lead in engagement with the container caps. Within the plunger 33 a top pressure plunger 38 is mounted for sliding reciprocation. At the upper end of this plunger a collar 39 is provided which overlaps the upper end of the plunger 33, and a pair of apertured lugs 40 is mounted above the collar. Into the lower end of the plunger 38 a pressure block 38a is screwed. The platform 16 carries a bracket 41 to which a pair of levers 42, 43 is pivotally mounted. The lever 42 has slots 42a engaged by a pin 44 which traverses the lugs 40. The lever 43 is also provided with a slot 43a through which protrudes trunnions 45 on the plunger 33. In order to accommodate the vertical reciprocations of the trunnions 45 a slot 46 is formed in the collar 32.

Each of the levers 42, 43 carry corresponding cam follower rollers 42b and 43b adapted to be engaged by the cams on the drum 8 during the rotation of the head platform 16 with the container table 25.

Instead of providing a subplatform 29 (Figure 4) for guiding the plunger 28 and forming an abutment for the springs 30, buckets 47 may be provided on the table 25 for the reception of the container rest platforms 27 as shown in Figure 10.

The container feeding mechanism comprises a post 48 rotatably mounted in a bearing column 49 secured in the upper main platform 20. This post has at its lower end a pinion 50 meshing with the drive pinion 24. At the upper end of the post 48 a feed table 51, is mounted, provision being made for circumferential adjustment by set screw and slots indicated at 52, so that the feeding table may be adjusted with respect to the position of the container platforms 27.

At the periphery of the part 51 of the feeding table container feeding sockets 53 are formed for receiving capped containers from a supply conveyor 54 in known manner. An arcuate guard rail and guide 55 is provided for maintaining the containers in position in their sockets as the feeding table rotates and carries the containers round from the infeed station to the position in which they are discharged in register upon the container rest platforms 27.

In the arcuate path of the containers from the infeed position to the container rest platform and in the vertical zone of the caps of the containers, an inverted channel member or the like 58 is mounted (see Figures 4 and 5), the interior walls of which carry electrical resistance elements 58a for preheating the container caps while they are travelling in their arcuate path for delivery to the table 25.

The containers may be removed by hand from their platforms 27 after the cap securing operations have been performed, or any suitable known automatic discharge device may be provided, for example a star wheel 56 may be appropriately mounted as seen in Figure 5 which engages the containers in turn and delivers them through a discharge chute 57. Any suitable means may be provided for driving the star wheel 56 in synchronism with the arrival of the containers at the discharge station.

Fixed cams constitute a suitable means for operating the plunger members of the head and these cams in the present example comprise a ring cam 9 for engaging the roller 42b of the inner plunger lever 42 and for permitting its return against the action of the spring 34 when its operation has been completed. An arcuate cam 10 is provided on the drum 8 for engaging the roller 43b of the lever 43. The lever 42 in addition to operating the inner plunger also operates, through the collar 39, upon the die plunger 33 for bringing it to its initial and centering position. The cam 10 serves to depress the plunger 33 while the return of this plunger in advance of the plunger 38 is positively secured by an arcuate cam 11 seen in Figure 12.

In operation, assuming the various parts of the machine have been set to function in synchronism, containers are fed (by hand or along a conveyor) with their caps 3 in position, into the socket 53 of the feed table 51 as the table revolves. The heating means in the channel 58 are switched on and as the containers slowly travel on their arcuate path the thermoplastic caps are heated to about 170° to 180° F. or such other temperature as the particular thermoplastic of the caps require in order to render them mouldable to the container necks. As the containers reach the end of their arcuate course and the sockets 53 come into register with the platforms 26 the containers are in turn released and positioned upon the platforms 27 with the necks of the containers coaxially beneath the throat members 35 of the heads. As each container passes round with the rotation of the table 25, the cams on the drum 8 come into operation: first the cam 9 engages the roller 42b and depresses the plunger 38 which carries with it the plunger 33 so that the throat radius 37 centres on the cap while the pressure block 38a engages the top of the cap (Figure 9), exercising a force which compresses the lining disc 6 firmly on to the rim of the mouth of the container such that a secure seal is made. The cam 9 is so shaped that this pressure remains for a suitable period while the cam 10 comes into operation to engage the roller 43b of the lever 43, causing the throat member 35 to descend further down over the skirt of the cap (Figure 10). By reason of the tapering throat portion 36 and lead-in 37 the top of the cap is snugly overlaid as at 59, bending the liner 6 over the rim of the container, see Figure 11 which also shows the compression of the liner 6 by the block 38a. The gradual taper of the throat 36 constricts the skirt portion 4 of the cap upon the thread 2 of the container neck, causing a facsimile fragmentary impression to be produced as at 60 in each rib 5 of the cap. The pressure of the block 38a and the throat member 35 is maintained during rotation of the heads and tables for an appropriate period to enable the thermoplastic of the caps to set sufficiently to permit of the release of the caps with safety. Release is effected as each head in turn comes to the end of the cam 10 when the spring 34 assisted by the cam 11 retracts the plunger 33 and throat 35. While this is taking place the cam 9 is still maintaining the block 38a in its position on the top of the cap, so that the container is not displaced as the throat is withdrawn. After the withdrawal of the throat, the lever roller 42b comes to the rise of the cam 9 and the plunger 38 and pressure block 38a is retracted by the spring 34, freeing the container for removal by hand or by the star wheel contrivance 56. The table continues its rotation, returning the emptied sockets 53 to the charging station for the recommencement of the cycle of operations.

It will be understood that the plunger mounting of the pressure block and throat die and the lever means for operating such, as well as the cam means for promoting the movements, may be varied or substituted by equivalent means adapted to perform the same functions for bringing about the synchronous displacements required for the constricting capping operation.

I claim:

1. A method of making an interrupted screwthread fitting engagement between a container mouth having a continuous external screwthread and a thermoplastic cap having a top portion and a cylindrical skirt formed locally of increased thickness by ribbing projecting from the interior surface of the skirt, comprising pressing the said top portion of the said cap, preheated to render it suitably plastic, onto the rim of the container mouth and then applying a pressure contact around the exterior periphery of the skirt and progressively advancing such pressure contact axially downward over said skirt to force the skirt ribbing, without bending the skirt, onto said container screwthread and cause a local displacement of the plastic material of the ribbing where it engages the container screwthread thereby producing in the ribbing, concave depressions which constitute the counterpart of the container thread in interrupted form of which there is no visible indication on the exterior of the skirt.

2. A method according to claim 1 wherein the pressure contact operates at progressively decreasing diameters downwardly.

3. A method of making an interrupted screwthread fitting engagement between a container mouth having a continuous external screwthread and a thermoplastic cap having a top portion and a cylindrical skirt formed locally of increased thickness by ribbing projecting from the interior surface of the skirt, comprising heating the said cap to render it suitably plastic, pressing the said top portion of the cap onto the rim of the container mouth and then applying a pressure contact around the exterior periphery and progressively advancing such pressure contact axially downward over said skirt to force the skirt ribbing, without bending the skirt, onto said container screwthread and cause a local displacement of the plastic material of the ribbing where it engages the container screwthread thereby producing concave depressions which constitute the counterpart of the container thread in interrupted form of which there is no visible indication on the exterior of the skirt.

EDWARD THOMAS WEBB.

REFERENCES CITED

The following references are of record in the file of this patent:

UNITED STATES PATENTS

| Number | Name | Date |
|---|---|---|
| 954,200 | Mueller et al. | Apr. 5, 1910 |
| 1,348,908 | Taylor | Aug. 10, 1920 |
| 1,577,024 | Hammer | Mar. 16, 1926 |
| 1,720,835 | Holmdahl | July 16, 1929 |
| 2,014,093 | Terrill | Sept. 10, 1935 |
| 2,064,042 | Von Till | Dec. 15, 1936 |
| 2,142,302 | Burrell et al. | Jan. 3, 1939 |
| 2,178,664 | Hogg | Nov. 7, 1939 |
| 2,325,309 | De Swart | July 27, 1943 |
| 2,364,380 | Marek | Dec. 5, 1944 |
| 2,373,708 | Price et al. | Apr. 17, 1945 |
| 2,401,511 | Rue | June 4, 1946 |
| 2,409,788 | Osborne | Oct. 26, 1946 |
| 2,422,750 | Rue | June 24, 1947 |
| 2,431,114 | Golding | Nov. 18, 1947 |
| 2,541,601 | Nelson | Feb. 13, 1951 |